(No Model.) 2 Sheets—Sheet 1.

H. C. SPENCER.
STUDENT'S COPY BOOK.

No. 435,051. Patented Aug. 26, 1890.

Witnesses:
William W. Mortimer
N. R. Kennedy

Inventor:
H. C. Spencer
By Phil T. Dodge
Atty.

THE NORRIS PETERS CO., PHOTO-LITHO., WASHINGTON, D. C.

(No Model.) 2 Sheets—Sheet 2.

H. C. SPENCER.
STUDENT'S COPY BOOK.

No. 435,051. Patented Aug. 26, 1890.

Witnesses:
M. W. Mortimer
W. R. Kennedy

Inventor:
H. C. Spencer
By Pric. T. Dodge Atty

UNITED STATES PATENT OFFICE.

HENRY C. SPENCER, OF WASHINGTON, DISTRICT OF COLUMBIA, ASSIGNOR OF ONE-HALF TO HARVEY A. SPENCER, OF NEW YORK, N. Y.

STUDENT'S COPY-BOOK.

SPECIFICATION forming part of Letters Patent No. 435,051, dated August 26, 1890.

Application filed June 16, 1890. Serial No. 355,597. (No model.)

*To all whom it may concern:*

Be it known that I, HENRY C. SPENCER, of Washington, in the District of Columbia, have invented certain Improvements in Students' Copy-Books, of which the following is a specification.

The aim of my invention is to provide an improved book for use in teaching penmanship, which shall possess all the advantages of those now in use, and, among others, the additional advantages of occupying a smaller place on the desk; of giving a flat surface and a uniform thickness of paper beneath the pen; of permitting the student to occupy a natural and healthful position; of permitting the sheets to be preserved after use in flat form, and of retaining extra or detached sheets in position for convenient use and preservation. These ends I accomplish by perforating the usual copy-leaves near the inner end, so that they may be readily detached, and by providing the cover with a flap and with a fly-leaf adapted to retain the detached leaves and the additional or extra sheets of paper, the fly-leaf being also provided on one side with the copy and on the opposite side with lines or forms, as hereinafter more fully explained.

Figure 1:
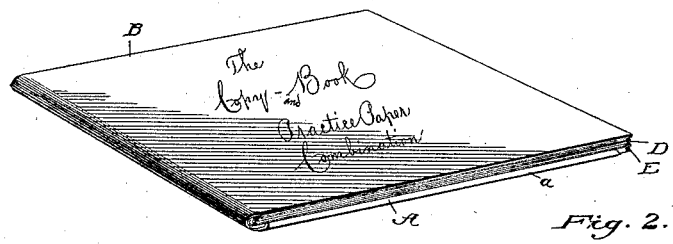
Figure 2:
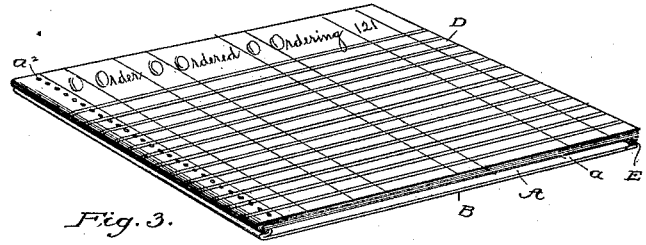
Figure 9:
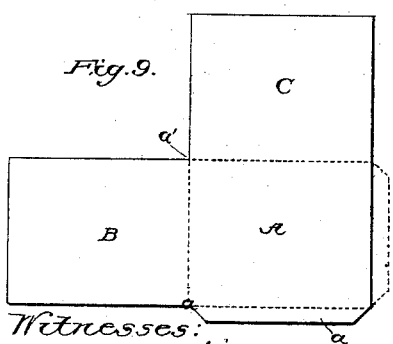

In the accompanying drawings, Figure 1 is a perspective view of my book as it appears when closed. Fig. 2 is a view of the book as it appears when in an operative position. Figs. 3, 4, 5, 6, 7, and 8 are perspective views showing the book in different forms in which it may be adjusted for different positions. Fig. 9 is a plan view showing the cover of the book with the fly-leaf and flap attached.

Referring to the drawings, A B represent the cover of my book, usually formed from a single sheet of paper, the portion A being provided at one edge with a flap $a$, adapted to be turned inward thereon, and at the opposite edge with a fly-leaf on the sheet C, adapted to be turned inward, so as to cover the portion $a$, or to be turned outward therefrom, as shown in the several figures. I commonly construct the entire covering, the flap, and the fly-leaf in one piece—that is to say, from a single sheet of paper—but they may be made in separate parts and united in the form shown.

D D represent a series of so-called "copy-leaves," provided at their upper edges with copies or designs to be imitated by the pupil, as in existing books. These leaves D are stitched or otherwise fastened at one end to the middle of the cover on the line $a'$ $a'$ of Fig. 9, so that they may be turned from right to left after the manner of the leaves of an ordinary copy-book. Near the inner end each of the leaves is perforated or scored transversely, as shown at $a^2$, so that after the leaf has been written upon it may be readily torn loose and transferred to the back of the book, where it may be confined in place beneath the closed fly-leaf C by means of the cap $a$.

In making use of the book the covering-leaf B is ordinarily turned backward under the leaf A, as shown in Fig. 2, so that it presents upon the desk the length of one leaf only, as shown in Fig. 2. This is advantageous in that the pages do not project or overhang the desk to be crumpled or curled by contact with the student occupying the desk in front or by those passing the ends of the desk. As the successive leaves are detached and transferred to the back of the book, it presents at all times a flat surface and a uniform thickness of paper beneath the pen. In ordinary books having the leaves permanently attached so that they require to be folded backward, it is found practically impossible to keep the leaves down in a flat form.

Figure 6:
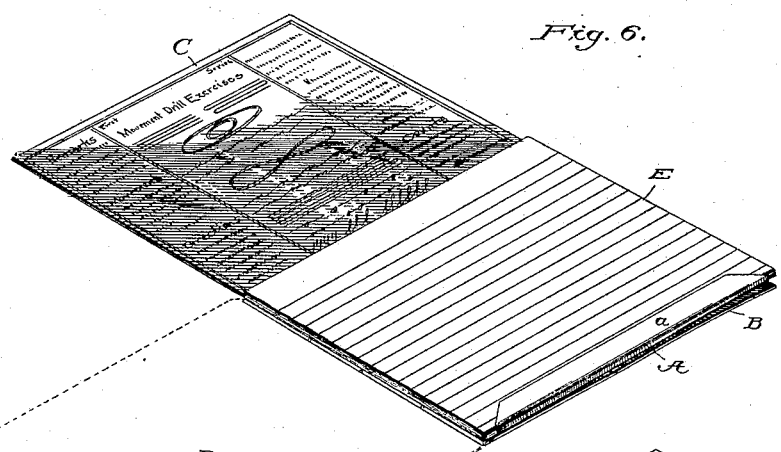

The fly-leaf C is provided on that face which is uppermost when the leaf is extended with suitable copy or designs to be imitated by the pupil, preferably what are called "movement drill-exercises," as shown in Fig. 6.

Figures 7, 8:
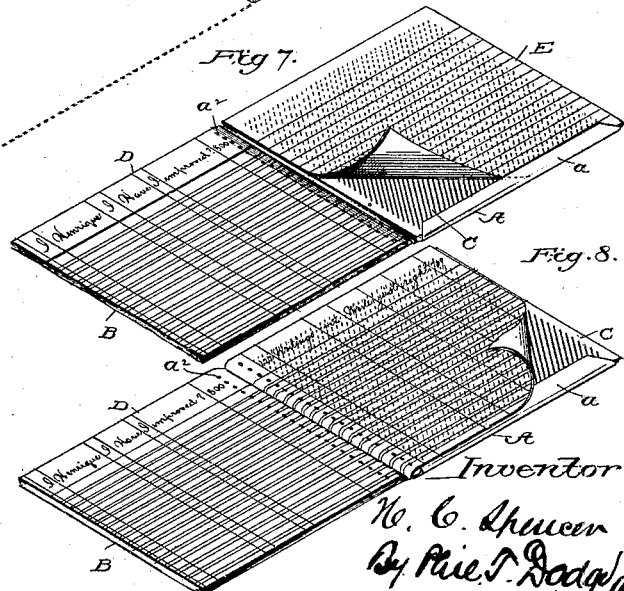

On the opposite or outer face the fly-leaf is provided, as shown in Fig. 7, with the series of inclined parallel lines, so that when the sheet is turned under the blank sheet the lines will appear therethrough as a guide to determine the slant or inclination of the letters. The fly-leaf may also be provided on the same surface with a series of lines or curves, such as are shown in Fig. 7 or of any other suitable character.

Figure 3:
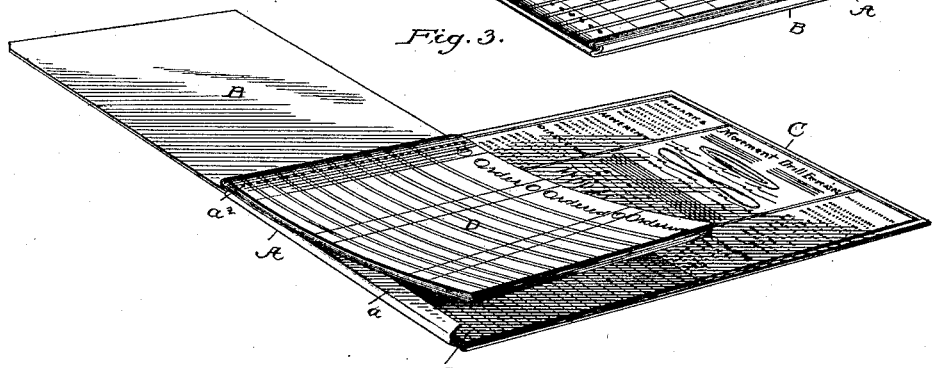
Figure 4:
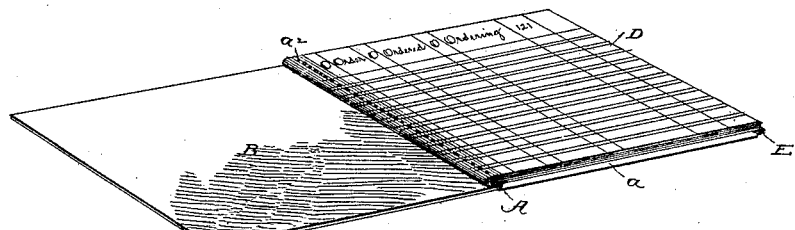

E E represent a series of loose sheets commonly known as "exercise-sheets," substantially corresponding in size with the leaves of the book and placed against the inside of the rear cover A, where they are retained by means of the flap $a$ and the fly-leaf. The fly-leaf may be turned outward, as shown in Fig. 3, in order that the copy thereon may be in view of the student while writing on the leaves D; or the leaves D may be folded under the back of the book, exposing the extra leaves E at the top, as shown in Fig. 6, in which case the fly-leaf being exposed above the sheet and in view of the student, facilitates the imitation of the copy thereon. The fly-leaf may be folded inward beneath the uppermost of the extra sheets E, as shown in Fig. 7, in which case inclined lines on the outer fly-leaf may be seen indistinctly through the sheet.

Figure 5:
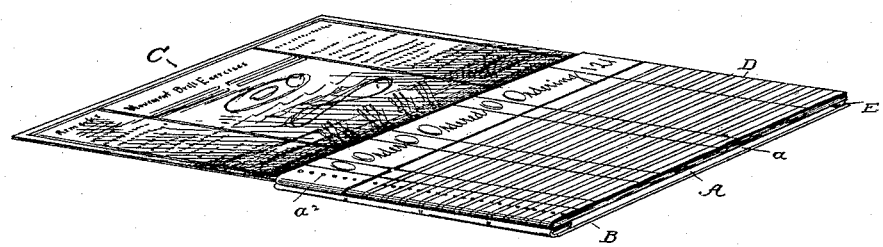

In making use of my book the cover may be folded back, as in Fig. 2, to expose the front sheet D, bearing copy, and in this shape the book requires on the desk the space of one leaf only. As the successive leaves are covered with script they may be detached and transferred to the back of the book beneath the flap and fly-leaf and there confined and preserved in a clean condition and in flat form. When the copy on the inside of the fly-leaf is to be used, the leaf is turned outward to expose its inner face, as shown in Figs. 3, 5, and 6. When the fly is thus exposed, the copy-leaves D may be exposed at its lower edge, as in Fig. 5, or the leaves D turned under and the uppermost of the loose sheets exposed, as shown in Fig. 6. The inclined lines on the outside of the fly-leaf may be exposed through the upper leaf D, as in Fig. 8, or through a loose sheet, as in Fig. 7.

In special cases I propose to dispense with the front leaf B of the cover, retaining, however, the other features herein described.

Having thus described my invention, what I claim is—

1. The improved copy-book comprising the cover A B, with fly-leaf C, and flap $a$, and the perforated leaves D, fixed to the cover and adapted when detached to be confined beneath the fly-leaf.

2. In a copy-book, the cover A B, having the leaves D attached thereto, and the fly-leaf C, provided on one side with guiding-lines and on the opposite side with copy.

3. A copy-book provided with leaves arranged to turn from right to left, and with a fly-leaf arranged to turn at right angles to the first-named leaves, said fly-leaf provided on its inner face with copy.

4. The copy-book comprising the cover, with the fly-leaf and flap attached, the perforated leaves attached to the cover, and the independent sheets confined by the flap.

In testimony whereof I hereunto set my hand this 27th day of May, 1890, in the presence of two attesting witnesses.

HENRY C. SPENCER.

Witnesses:
W. R. KENNEDY,
F. STANLEY ELMORE.